United States Patent [19]

Carre

[11] Patent Number: 4,641,039
[45] Date of Patent: Feb. 3, 1987

[54] WIND MOTORS AND AEROGENERATORS

[75] Inventor: Jean Carre, Mailly-la-Ville, France

[73] Assignee: Groupment d'Interet Economique Aerogenerateurs Carre, Mailly-la-Ville, France

[21] Appl. No.: 648,174

[22] PCT Filed: Dec. 30, 1983

[86] PCT No.: PCT/FR83/00268
§ 371 Date: Aug. 30, 1984
§ 102(e) Date: Aug. 30, 1984

[87] PCT Pub. No.: WO84/02752
PCT Pub. Date: Jul. 19, 1984

[30] Foreign Application Priority Data

Dec. 30, 1982 [FR] France .................... 82 22121
Jun. 8, 1983 [FR] France .................... 83 09486

[51] Int. Cl.$^4$ ............................................. F03D 7/04
[52] U.S. Cl. ......................................... 290/44; 290/55; 416/145
[58] Field of Search .................. 290/44, 55; 416/139, 416/144, 145, 18

[56] References Cited

U.S. PATENT DOCUMENTS

| | | | |
|---|---|---|---|
| 2,451,541 | 10/1948 | Doman | 416/145 |
| 2,638,170 | 5/1953 | Prewitt | 416/145 |
| 3,469,633 | 9/1969 | Avondoglio | 416/139 X |
| 4,083,651 | 4/1978 | Cheney, Jr. et al. | 416/18 |
| 4,302,152 | 11/1981 | Jensen | 416/145 X |
| 4,331,881 | 5/1982 | Soderholm et al. | 290/44 |
| 4,352,629 | 10/1982 | Cheney, Jr. | 416/18 |

Primary Examiner—Bernard Roskoski
Assistant Examiner—W. E. Duncanson, Jr.
Attorney, Agent, or Firm—McAulay, Fields, Fisher, Goldstein & Nissen

[57] ABSTRACT

An aerogenerator or wind motor comprises a variable pitch propeller rotor. It comprises compensation means (13) which are sensitive to the deceleration of the rotor to automatically exert on each blade (3), in case of deceleration of the rotor, a force which is substantially equal and opposed to the perturbating force generated by the kinetic energy of the rear or unbalanced mass of the blade.

20 Claims, 12 Drawing Figures

WIND MOTORS AND AEROGENERATORS

The present invention relates to improvements in wind-powered engines and aerogenerators comprising a rotor with variable-pitch propeller and regulating their speed of rotation by orientation of the wings in the sense of retraction or feathering.

In an aerogenerator of the above type, the axis constituting the pivot of each variable pitch blade lies in the front part of the profile of the blade, at the point of equilibrium of transverse aerodynamic lift thereof, i.e. approximately in the front quarter of the types of profiles used, the latter being defined as having to possess a good stability of this point of equilibrium. Consequently, the section, or the outer length of the outline of the profile of the blade is much greater to the rear of this point of aerodynamic equilibrium, towards the trailing edge, than it is towards the front, towards the leading edge. The rear mass of the blade is therefore much greater than the front mass.

For such a receiving propeller to function, the chord of the profile of each blade must have a helix angle with respect to its plane of rotation. Consequently, the rear and front masses of the profile of the blade are not aligned in the plane of rotation of the rotor, passing through the pivot axis of the blade on itself, but they lie respectively to the rear and in front of this plane. These rear and front masses being unequal and the rear mass being predominant, this results in the existence of an out-of-balance or disturbing rear mass with respect to the front mass of the blade, whatever the speed of rotation of the rotor.

In the event of rotation of the propeller slowing down due to any effect such as a drop in the wind, eddy, delay of regulation reversing the angle of attack of the profile, use of the power of the machine, etc. . . . , such a deceleration creates a disturbing or parasitic force resulting from the kinetic energy of the unbalanced rear mass of the blade. This disturbing force then tends to pivot the blade to a position of feathering with all the consequences of this action.

In particular, in strong wind, the regulation moving away the application of this force and more substantially if the machine is off-load, in the event of slowing down of the wind or of delay of regulation, the propeller slowing down, the disturbing force resulting from the kinetic energy of the unbalanced rear amss of the blade causes this blade to pivot about its axis and brings about a transfer of the lift which converts the previously receiving propeller into an energy-absorbing pushing propeller. Such absorption leads in turn to an increase in the deceleration of the rotor with amplification of the phenomenon until the kinetic energy of the assembly disappears. This phase over, the blades return to face the wind, the propeller starts off again and the phenomenon may then resume.

Such a rapid and sudden change in situation in which the propeller is alternately receiving and pushing, presents the drawback that the machine is not very productive and, in addition, it may cause the rapid destruction thereof. It should be noted that the use of the machine brings about the same effect of deceleration and consequently the same effect of retraction of the blade, hence a temporary disappearance of the angle of attack and of possibility of power, with possibilities of appearance of pumping phenomena. However, in that case, due to the absorption of the kinetic energy of the rotor by outside use of the power, the effect is more limited and the risk of the propeller becoming pushing is less.

It is an object of the present invention to overcome these drawbacks by providing these aerogenerators or wind-powered engines with particularly simple means for avoiding the tendency of the blade to feather in the event of deceleration of the rotor.

It is a further object of the invention to obtain a better use of the wind whose velocity is less than the nominal speed for which the aerogenerator was designed, an exact control of the speed of rotation of the propeller of the aerogenerator and consequently of the period of the alternating current possibly produced thereby, and a strict control and limitation of the output power of the aerogenerator.

To this end, this aerogenerator or wind-powered engine comprises a rotor with a variable-pitch propeller, on which the blades are mounted to pivot about their respective axes, whilst being dynamically out-of-balance and consequently presenting an out-of-balance or disturbing rear mass, is characterized in that it comprises compensating means sensitive to the deceleration of the rotor in order automatically to exert on each blade, in the event of deceleration of the rotor, a force opposing the disturbing force created by the kinetic energy of the rear or out-of-balance mass of the blade, so as to compensate this disturbing force.

According to a first embodiment of the invention, the compensating means may be constituted, for each blade, by a mass placed on the front of the profile of the blade opposite the disturbing rear mass. In practice, these masses which are supported by the blades, considerably increase the mass thereof and the fatigues due to the centrifugal effects, so that this means can only be used rarely.

According to a variant embodiment of the invention, the compensating means are preferably constituted by one or more masses independent of the blades and opposing the disturbing rear mass thereof, these independent masses being capable of supporting their own centrifugal stress or transferring them onto elements of the rotor subjected to lesser fatigues. For example, the compensating means may advantageously be constituted by a ring forming an inertia flywheel occupying the maximum of the available diameter.

In the event of balancing or of a control of rotation of the blades for regulation by hydraulic or pneumatic devices, the compensating means may be constituted by an inertial mass appropriately regulating the fluid flows of these hydraulic or pneumatic devices.

The connection between the blades and the hydraulic or pneumatic devices is then such that the slowing down of the compensating inertial mass creates the appearance of a force opposite the disturbing force created by the kinetic energy of the rear mass of each blade, thus compensating this rear mass.

The aerogenerator acording to the invention offers several other advantages.

Firstly, as the masses and forces are established for the highest wind velocity that can be envisaged, i.e. when the blades are very largely retracted and the distributing mass (out-of-balance rear mass of the blade) is very remote from the plane of rotation passing through the pivot axis of the blade, the compensating force becomes in excess as the wind and consequently the pitch of the blades reduces and the disturbing force approaches this plane. This is an important advantage since, further to a slowing down due to the use of the machine, i.e. to a loading, the excess of the compensating force exerting on the blades gives the latter the angle of attack necessary for aerodynamic loading, the lift required of each blade demanding to be increasingly greater due to the decrease of the resultant of the driving effects, as the chord of the profile of the blade tends to be aligned on the plane of rotation. This means therefore makes it possible to improve production of the machines whilst avoiding the phenomena of pumping. Moreover, by the same effects acting inversely, it stabilizes and limits the efforts of acceleration in rotation due to the increases in the velocity of the wind and it moderates the working and regulation of the machine.

In a known aerogenerator of the above type, the rotor also comprises a regulating device comprising a coaxial regulation plate adapted to be subjected to a determined angular clearance with respect to the rotor, transmission means for transmitting the pivoting movement of the blades about their axes to this regulation plate and elastic return members disposed between the frame of the rotor and the regulation plate in order to maintain the blades in the desired angular position, about their respective axes, when the rotor rotates at its nominal speed, the connection between the blades and the the plate being such that the slowing down of the plate with respect to the rotor brings about an increase in the pitch of the blades going as far as feathering and, on the contrary, such that an acceleration of the plate brings about a decrease in the pitch.

According to a complementary feature of the invention, in the case of using a ring forming the inertia flywheel with a large diameter therefore with high speed of advance, this ring may preferably be used as a rotor disc of an induction motor or electromagnetic inhibitor for the purpose of additionally controlling regulation. The aerogenerator may therefore comprise, in the case of using a linear induction motor comprising a fixed inductor and the rotor inertia disc or ring fast with the regulation plate, a device for controlling the electrical supply of this linear induction motor which is controlled by the differential effect between the period of the alternating electric current produced by the alternator driven by the rotor and that of a periodic electric reference signal.

This linear induction motor exerts if necessary, on the regulation plate, via the inertia disc or ring serving as a rotor, a drive torque or, on the contrary, a brake torque depending on whether the speed of rotation of the propeller tends towards a value lower or higher than the ominal value and consequently it modifies the pitch of the blades and ensures a constant speed for the rotor, hence a fixed period for the alternating current produced by the alternator fast with the rotor.

The aerogenerator may also comprise an inhibitor with eddy currents acting on the rotor disc or, preferably, on the inertia ring fast with the regulation plate and which is supplied as a function of the curves and of an intensity ceiling of the production current in order to limit the power of the aerogenerator.

Furthermore, to facilitate the action of the electromagnetic back-ups and to obtain a better use of the wind having a velocity less than the nominal velocity for which the aerogenerator was designed, an elastic stop is additionally provided, placed between a mobile point of the regulation device and a point of the armature of the rotor, so that the elastic stop, of limited stroke, exerts an action on the regulation device opposing the effort exerted by the elastic return members on the regulation plate, sensitive when the speed of rotation of the rotor becomes close to and slightly less than the nominal speed of rotation.

Thanks to this additional elastic stop, and by means of low torque, the blades may be given, for a speed of rotation slightly less than the nominal speed, an inclination with respect to the transverse plane passing through the axis of the blade, slightly less than what the blade would take in the absence of this stop.

Various embodiments of the present invention, given by way of on-limiting example will be described with reference to the accompanying drawings, in which.

Figure 1:
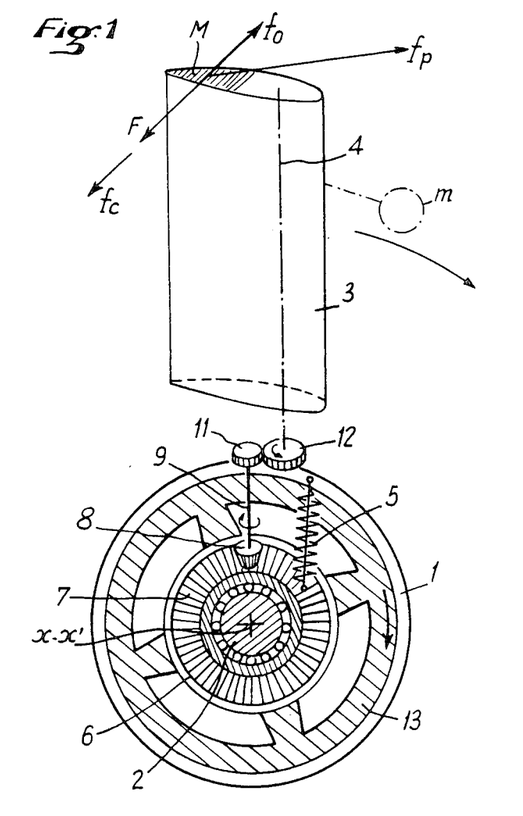
FIG. 1 is a schematic view in perspective of an aerogenerator according to the invention provided with means compensating the disturbing force due to the kinetic energy of the out-of-balance rear mass of a blade.

FIG. 1 schematiclly shows the frame 1 of a rotor fast with a central hub 2 and on which a plurality of blades 3 are mounted. A detailed description of such an aerogenerator is given in French Patent No. 2 291 378. The blades 3 of the rotor are regularly distributed about axis xx' of the hub 2, each of these blades 3 itself being mounted to pivot about an axis 4 which is preferably inclined forwardly with respect to the axis of rotation xx' of the rotor. The axis 4 of each blade 3 is offset towards the leading edge of the blade, ling substantially in the front quarter of the blade, so that the front mass of the blade between this leading edge and axis 4 is less than the rear mass lying opposite axis 4 and consequently, during rotation of the rotor, each blade 3 is subjected to a centrifugal force indicated by arrow $f_o$, when the rotor rotates at a speed $V_0$, This force is due to the kinetic energy of that part of the rear mass of the blade 3 which is not balanced by the front part. This out-of-balance or disturbing rear mass M is indicated hatched in FIGS. 1 and 2.

The rotor of the aerogenerator is provided with a regulation device ensuring a dynamic balance of the blades 3 and which comprises, for example, for each blade 3, an elastic return member 5 of which one end is connected to the frame 1 of the rotor and the other end is hooked to a circular transverse regulation plate 6 mounted to rotate on the hub 2 of the rotor and bearing a ring gear 7 centred on axis xx' of the rotor. With this ring gear is meshed, for each blade 3, a bevel gear 8 fast with a rod 9 which bears at its end a gear 11 in mesh with another gear 12 centered on the axis 4 of the blade 3 and fast therewith. Consequently, when the rotor rotates at speed $V_0$, the blade 3, due to its dynamic out-of-balance, tends to rotate the ring gear 7 and the regulation plate 6 in anti-clockwise direction in FIG. 1, i.e. in fact opposite the direction of rotation of the rotor, under the action of the centrifugal force $f_o$, and the elastic return member 5 exerts on the regulation plate 6 a thrust which is transmitted to the blade 3 and which gives a force F opposing the centrifugal force $f_o$ as may be seen in FIG. 2. Consequently, each blade 3 is maintained inclined at an angle a with respect to the transverse plane of rotation P passing through the pivot axis 4 of the blade 3, this angle a being the value of equilibrium corresponding to the ominal speed of rotation. Such a device thus produces a centrifugal regulation system.

Figure 2:
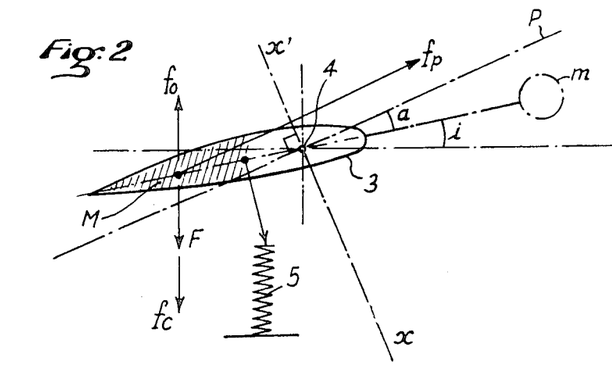
FIG. 2 is a diagram illustrating the action of the compensating means.

Upon slowing down of the rotation of the propeller for any reason, for example a drop in the wind, the kinetic energy of the out-of-balance rear mass M leads to the appearance of a disturbing force $f_p$ which tends to pivot the blade 3 towards the position of feathering, i.e. to alignment in the plane containing the axis of rotation xx' and the pivot axis 4.

To compensate for this disturbing force $f_p$, the aerogenerator comprises, acording to the invention, means creating a compensating force $f_c$ opposing the disturbing force $f_p$.

Figure 3:
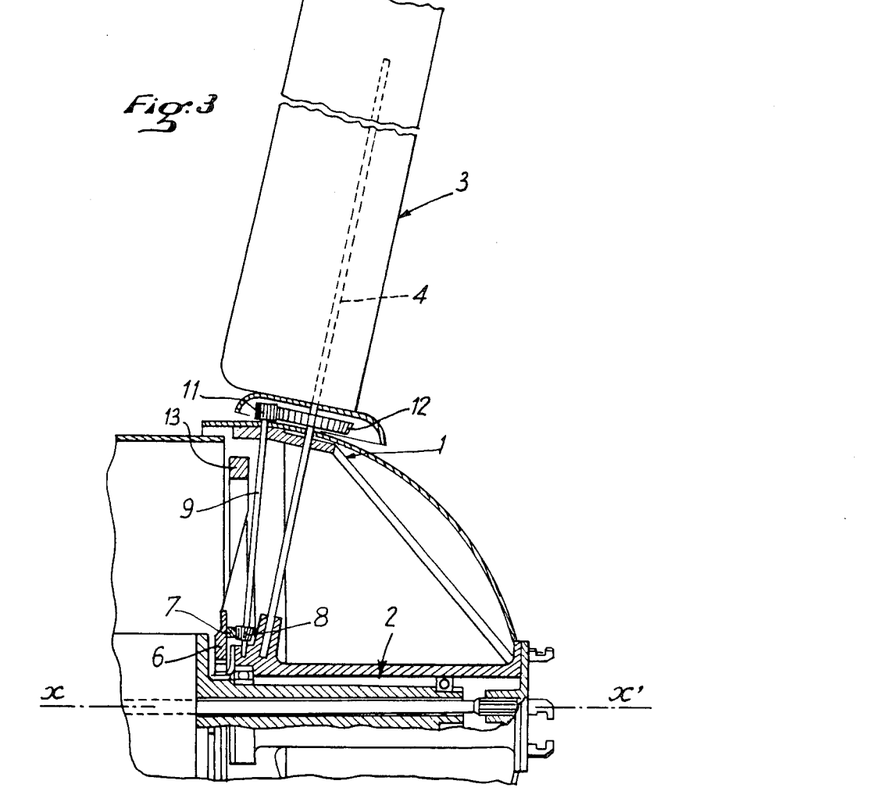
FIG. 3 is a view in partial axial section of the aerogenerator provided with the compensating means shown in FIG. 1.

In FIGS. 1 and 3, the compensating force $f_c$ is created by a ring 13 fast with the regulation plate 6 and forming an inertia flywheel. This ring 13 preferably presents the largest diamter possible which may be contained inside the frame 1 of the rotor, in order to limit the mass of this ring without introducing aerodynamic disturbances.

Consequently, in the event of deceleration of the rotor, the ring 13 forming the inertia flywheel tends additionally to rotate the regulation plate 6, in the direction of rotation, and this rotation is translated by a torque exerted on the blade 3 giving rise to the creation of the compensating force $f_c$. This compensating force $f_c$ therefore cancels the disturbing force $f_p$ so that the blade 3 conserves its optimal angle of attack i.

Other means may be provided to create the compensating force $f_c$ in the event of deceleration of the rotor.

These means may be constituted for example by a compensating mass m placed on the front of the profile of each blade 3, opposite the disturbing rear mass M. This mass m is indicated in dotted lines in FIGS. 1 and 2.

Figure 4:
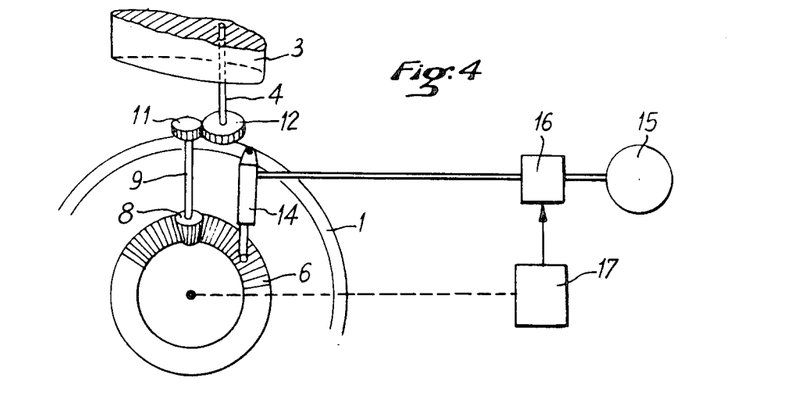
FIG. 4 is a diagram of a variant embodiment.

Another embodiment is schematically illustrated in FIG. 4. In this case, the elastic return members of the blades 3 are constituted by hydraulic or pneumatic jacks 14 mounted between the frame 1 of the rotor and the regulation plate 6. Each jack 14 is connected to a source of pressurized fluid 15 via a flowrate or pressure control member 16 itself controlled by a device comprising an inertia mass 17.

Consequently, in the event of deceleration of the rotor, the control device 17 incorporating inertia mass acts on member 16 in order additionally to supply the jack 14 and to rotate the regulation plate 6 in the direction creating the compensating force $f_c$.

In the variant embodiment shown in FIGS. 5 to 9, an elastic stop 18 such as a spring, jack or plastic stop, is placed at any point on the regulation device, between a mobile point thereof and a point of the armature of the rotor. For example, this elastic stop 18 may be borne by the regulation plate 6 on which the elastic return members 5 act and which may be more or less offset angularly with respect to the hub 2 of the rotor. This hub 2 is fast with a radial finger 19 which may come into contact with the elastic stop 18.

Figure 5:
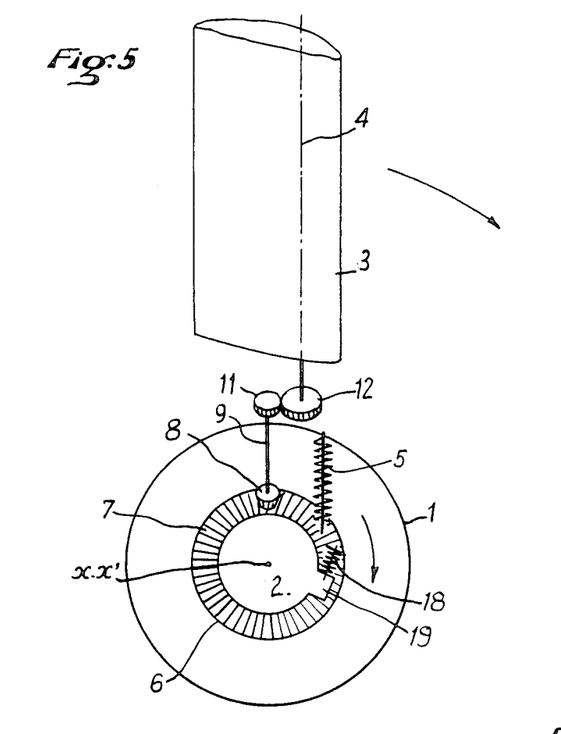
FIG. 5 is a schematic view in perspective of a device for balancing the centrifugal force of the blades in the vicinity of the nominal speed.

The elastic stop 18 acts against the elastic return members 5 and it has a limited stroke. It makes it possible to effect a controlled variation of the pitch of the blades, below the nominal speed $V_0$, with a very weak variation of the speed of the rotor.

Figure 6A:
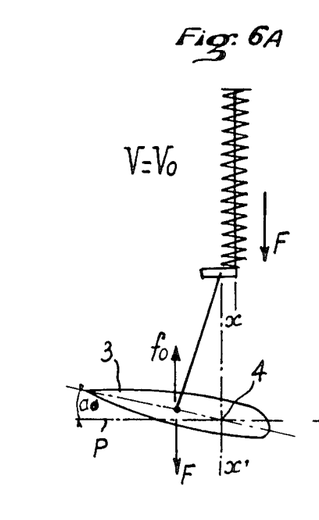
FIGS. 6A, 6B and 6C are diagrams illustrating the action of the return springs of the balancing device and of the elastic stop, at the nominal speed and a speed close thereto.
Figure 6B:
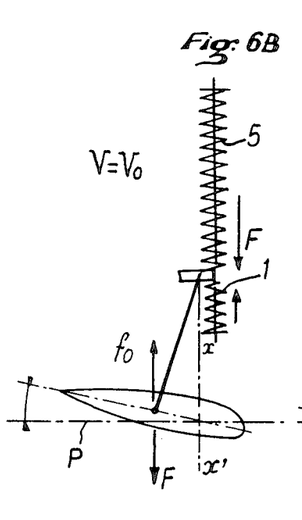
Figure 6C:
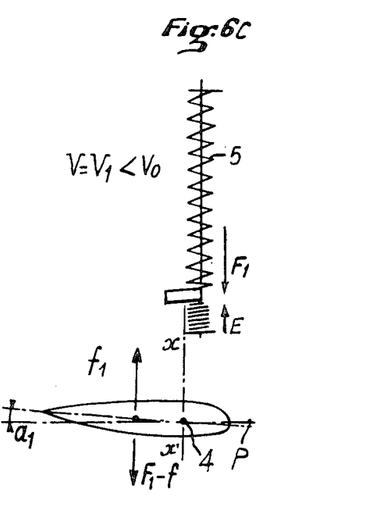
Figure 7:
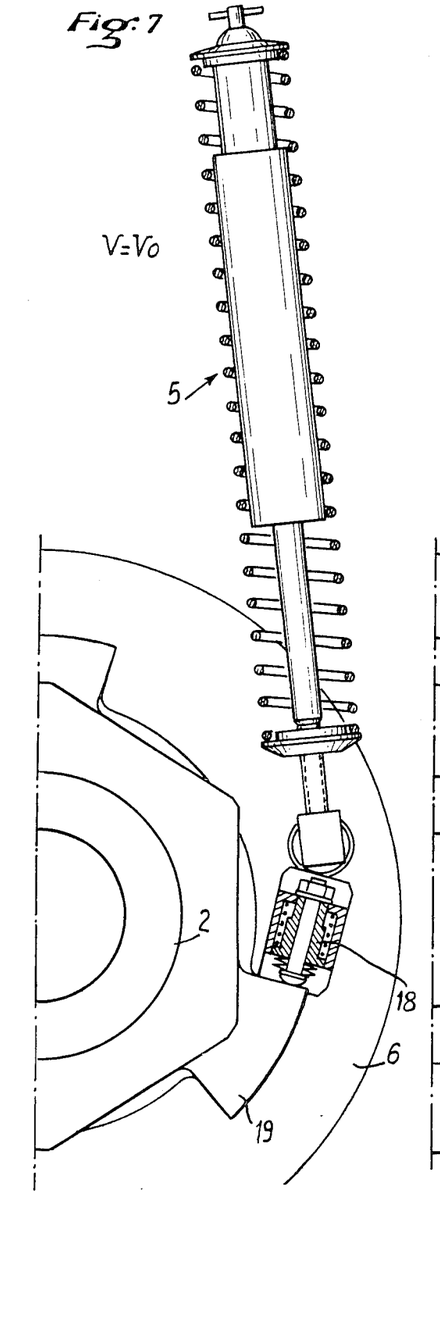
FIGS. 7, 8 and 9 are views in section, on a larger scale, of an elastic return member cooperating with an elastic stop, in positions corresponding respectively to a speed equal to, lower than and greater than the nominal speed.
Figure 8:
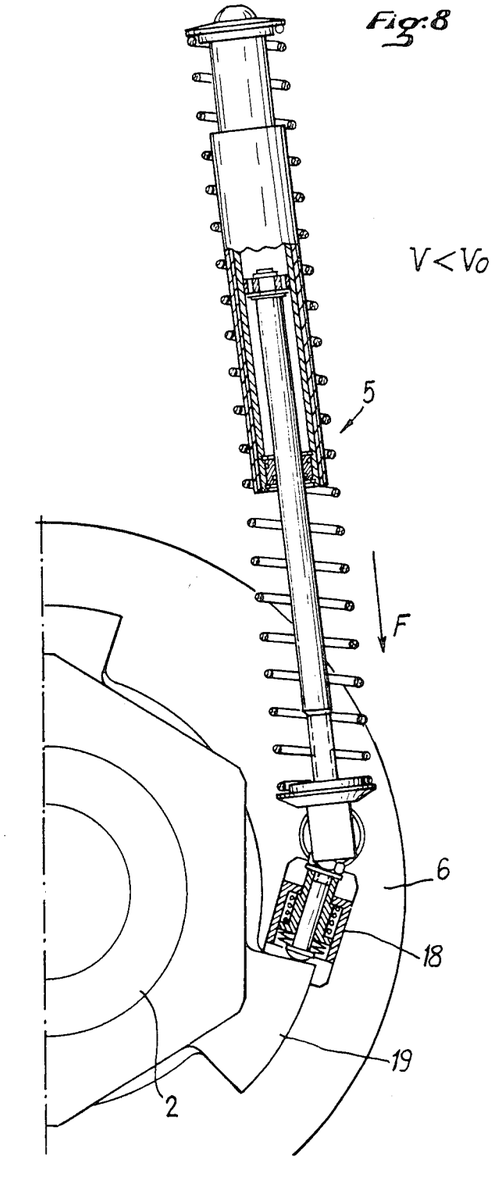

FIG. 6B illustrates the case of the rotor rotating at nominal speed $V_0$ and where the elastic stop 18 is provided. At this nominal speed $V_0$, the regulation plate 6 occupies a position, with respect to the hub 2 of the rotor, such that the elastic stop 18 is just in contact with the finger 19 fast with the hub 2 of the rotor and that it is ot compressed, in other words it does not exert any effort E on the regulation plate 6 (E=0). Consequently, the blade 3 is always subjected to the total return effort F of the elastic member 5 and it consequently forms the same angle $a_0$, with the transverse plane P passing through the pivot axis 4, as in the case of FIG. 6A, in which the stop 12 is ot provided. This position corresponds to the one illustrated in FIG. 7.

If the speed of rotation V of the rotor drops to a value $V_1$ less than the nominal speed $V_0$, the centrifugal force exerted on the blade 3 takes a value $f_1$ (FIG. 6C) which is less than its value $f_0$ when the rotor rotates at the nominal speed $V_0$. Due to the resulting out-of-balance, the return member 5 causes the blade 3 to rotate about its axis 4, so as to offset it in the direction of the transverse plane P passing through the pivot axis 4 of the blade so that this blade 3 then forms with this plane an angle $a_1$ which is smaller than the angle $a_0$ obtained with rotation at nominal speed $V_0$. In this position of equilibrium, the elastic stop 18 intervenes since since it is then compressed by the finger 19, as may be seen more clearly in FIG. 8. This elastic stop 18 then exerts an antagonistic effort E which opposes the force F1 of the elastic return member 5 and which is clearly less than said force.

From the foregoing description, it is seen that the elastic stop 18 can adapt the pitch of the blades 3 to wind velocities less than the minimum wind velocity for which the aerogenerator was designed. By exerting a low rotation torque on the regulation plate 6, it influences the initial setting of the pitch of the blades 3 and consequently the speed of rotation and the period of the electrical current produced.

According to a variant embodiment, the elastic stop 18 may be borne by the frame 1 of the rotor instead of being borne by the regulation plate 6.

Figure 9:
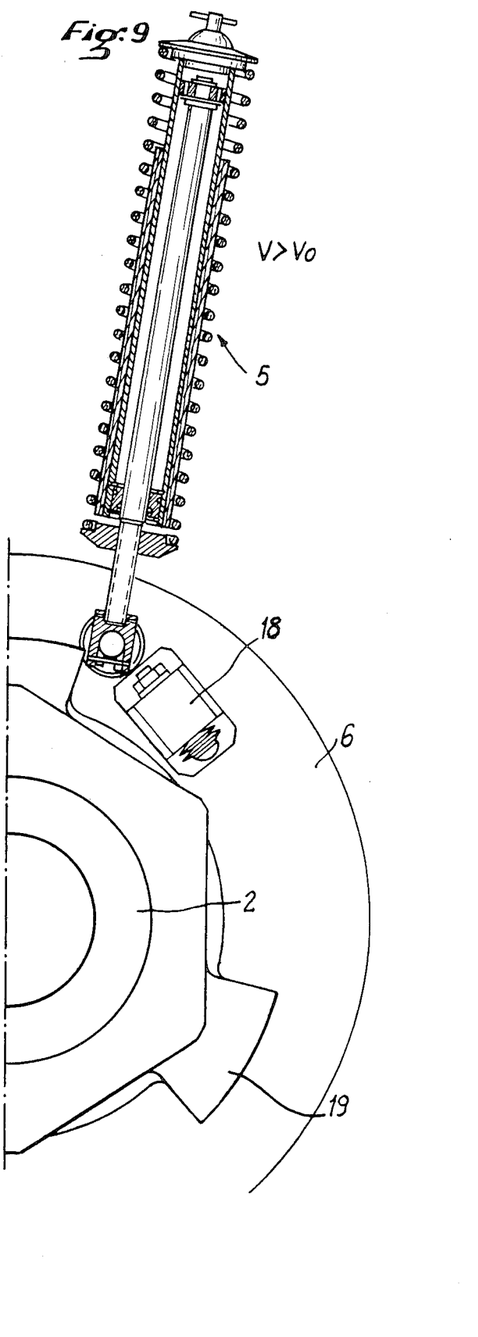

FIG. 9 illustrates an end position of the elastic stop 18 in the event of the rotor rotating at a speed greater than the nominal speed. In this case, the elastic return member 5 is strongly compressed and the elastic stop 18 is spaced apart from the finger 19 fast with the hub 2 of the rotor.

Figure 10:
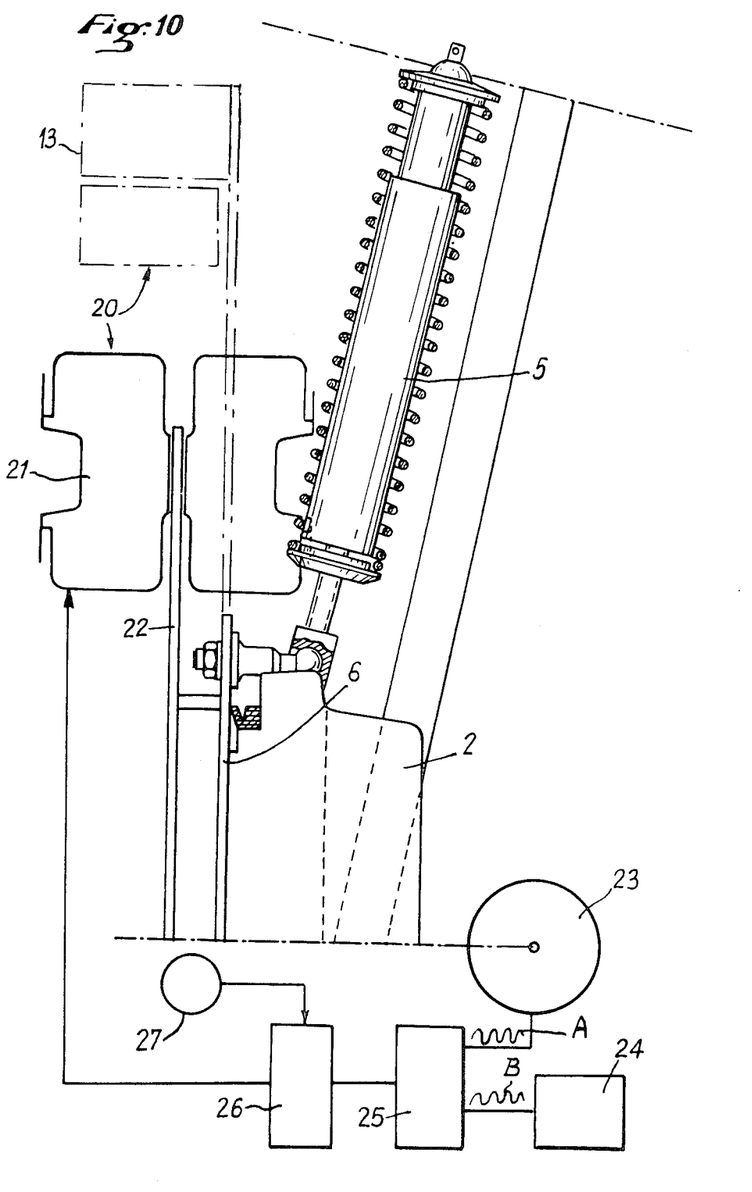
FIG. 10 is a schematic view in elevation of a device for controlling the speed of rotation and the output power of the aerogenerator.

To control the speed of rotation of the propeller of the aerogenerator with precision, a linear induction motor 20 may additionally be provided, comprising a fixed inductor 21 acting on a rotor disc 22 or, preferably, on the inertia ring 13, a shown in dotted lines in FIG. 10, fast with the regulation plate 6. This linear induction motor 20 is supplied and controlled by a differential effect between the period of the alternating electric current A produced by the alternator 23 driven by the rotor 2 and that of a periodic electric reference signal B. The reference signal B may be the frequency signal of the electric network or the output signal of a quartz reference oscillator 24 or of any other type. The measuring signal A and the reference signal B are applied to the two inputs of a frequency comparator 25 which delivers at its output a positive or negative error signal applied to a device 26 controlling the electrical supply of the linear induction motor 20.

If the speed of rotation of the propeller, and consequently the frequency of the electric current, are less than the nominal values provided, the comparator 25 detects that the frequency of the measuring signal A is less than the frequency of the reference signal B and applies a negaitve error signal on the device 26 which then supplies the motor 20 for the latter to exert, on the disc 22 or the inertia ring 13, a drive torque to advance rotation, or positive torque, and thus to reduce the pitch of the blades. On the other hand, if the speed of rotation and the frequency tend to exceed the fixed nominal values, the frequency comparator 25 applies to the control device 26 a positive error signal and this device 26 supplies to the motor 20 a control as a brake so that the latter exerts, on the disc 22 or the inertial ring 13, a resistant torque to delay rotation, or negative torque, and thus icreases the pitch of the blades 3.

Consequently, the motor 20, by controlling the pitch of the blades, ensures maintenance of the speed of the rotor at a constant value, hence a fixed period of the alternating current produced, if a power greater than that which may be furnished by the wind is not demanded.

The device 26 controlling the electrical supply of the motor 20 may also be connected to an anemometer 27 making it possible also to take into account the wind velocity, for control, in order to avoid aerodynamic stall of the propeller in the event of insufficient wind. Consequently, if the wind velocity drops to a low value, the anemometer 27 sends to device 26 a signal which then modifies the supply of motor 20 and modifies the positive torque on the disc 22 in order to avoid stall of the propeller. Electricity may be supplied by the generator of the aerogenerator as soon as starting is effected.

The torque supplied by the linear motor 20 must represent only a small fraction of the regulator torque furnished by the blades 3 in order not to be able to neutralize said torque and also not to endanger the installation in the event of discrepancy.

In general, the centrifugal regulations systems require, for correct functioning thereof, i.e. for the pitch of the blades 3 to be varied, a variation of effect of the centrifugal force, therefore of the speed of rotation of the rotor. In the case of the aerogeCnerator equipped with a synchronous or asynchronous, low-slide alternator having to be coupled directly to a fixed period electric network, the variation in speed becomes zero or insufficient to ensure said regulation. The speed of rotation therefore remains constant but the power furnished by the propeller increases in an uncontrolled manner with the wind velocity, which risks deteriorating the aerogenerator both in its electrical and mechanical parts.

According to a further feature of the invention, to overcome this drawback, an additional inhibitor may be provided which is disposed in the same manner as the linear induction motor 20 and using the rotating disc 22 or the inertia ring 13 for the production of eddy currents in braking period. This additional inhibitor is supplied as a function of the curves and of a ceiling of production current intensity determined by the slope of a known device. Consequently, this additional inhibitor limits the power of the aerogenerator, and possibly its speed and avoids damage being caused thereto.

I claim:

1. Aerogenerator or wind-powered engine comprising a rotor with variable-pitch propeller, wherein the blades (3) are mounted to pivot about their respective axes (4), whilst being dynamically out-of-balance and consequently presenting an out-of-balance or disturbing rear mass (M), wherein it comprises compensating means sensitive to the deceleration of the rotor in order automatically to exert on each blade, in the event of deceleration of the rotor, a force substantially equal to and opposing the disturbing force created by the kinetic energy of the rear or out-of-balance mass of the blade.

2. Aerogenerator or wind-powered engine according to claim 1 wherein the compensating means are constituted by a mass (m) placed on the front of the profile of each blade (3) opposite the disturbing mass (M).

3. Aerogenerator or wind-powered engine according to claim 2, in which the rotor comprises a regulation device comprising a coaxial regulation plate (6) or any other like device able to undergo a determined angular clearance with respect to the rotor, transmission means (7-12) for transmitting the pivoting movement of the blades (3) about their axes (4) to said regulation plate (6) and elastic return members (5) disposed between the frame (1) of the rotor and the regulation plate (6) in order to maintain the blades (3) in the desired angular position, about their respective axes, when the rotor rotates at its nominal speed, the connection between the blades (3) and the plate (6) being such that the slowing down of the plate with respect to the rotor brings about an increase in the pitch of the blades going as far as feathering and on the contrary an acceleration of the plate brings about a decrease in the pitch, wherein the compensating means are constituted by a ring (13) fast with the regulation plate (6) and forming an inertia flywheel.

4. Aerogenerator or wind-powered engine according to claim 3 wherein the compensating means are constituted, when the elastic return members of the blades are constituted by hydraulic or pneumatic devices (14), by means (15, 16) acting on the flowrate and supply pressure of said hydraulic or pneumatic devices, so as to compensate the disturbing force created by the out-of-balance rear mass.

5. Aerogenerator or wind-powered engine according to clalim 4, wherein it comprises an elastic stop (18) placed between a mobile point of the regulation device and a point of the armature of the rotor, so that the elastic stop (19), having limited stroke, exerts an effort (E) on the regulation device, opposing the effort (F) exerted by the elastic return members (5) on the regulation plate (6), with sensitive effect when the speed of rotation of the rotor becomes close to and slightly less than the nominal speed of rotation.

6. Aerogenerator according to claim 5 wherein the elastic stop (18) is borne by the regulation plate (6) and it cooperates with a finger (19) fast with the hub (2) of the rotor.

7. Aerogenerator according to claim 5 wherein the elastic stop is borne by the frame (1) of the rotor.

8. Aerogenerator according to claim 1, wherein it comprises a linear induction motor (20) comprising a fixed inductor (21) and a disc (22) or inertia ring (13) fast with the regulation plate (6) and a device (26) for controlling the electrical supply of this linear induction motor (20), which is controlled by differential effect between the period of the alternating electric current (A) produced by the alternator (23) driven by the rotor and that of a periodic electric reference signal (B).

9. Aerogenerator according to claim 3 wherein the reference signal is supplied by a reference oscillator (24).

10. Aerogenerator according to claim 9, wherein it also comprises an inhibitor employing eddy currents acting on the disc (22) or the inertia ring (13) fast with the regulation plate (6) and which is supplied as a function of the curves and of a ceiling of production current intensity in order to limit the power of the aerogenerator and possibly its speed.

11. Aerogenerator or wind-powered engine comprising:
   a rotor with a variable-pitch propeller with blades mounted to pivot about their respective axes, while being dynamically out-of-balance and consequently presenting an out-of-balance or disturbing rear mass;
   each said blade comprising compensating means sensitive to the deceleration of the rotor in order automatically to exert on each said blade, in the event of deceleration of the rotor, a force substantially equal to and opposing a disturbing force created by the kinetic energy of the rear or out-of-balance mass of the blade;
   said rotor including:
   a regulation device comprising a coaxial regulation plate or any other like device able to undergo a determined angular clearance with respect to the rotor, and
   transmission means for transmitting the pivoting movement of the blades about their axes to said regulation plate; and
   elastic return members disposed between the frame of said rotor and said regulation plate in order to maintain said blades in the desired angular position, about their respective axes, when the rotor rotates at its nominal speed;
   the connection between said blades and said plate being such that the slowing down of the plate with respect to said rotor brings about an increase in the pitch of the blades going as far as feathering and on the contrary an acceleration of said plate brings about a decrease in the pitch; and
   said compensating means being constituted by a ring fast with said regulation plate and forming an inertia flywheel.

12. Aerogenerator or wind-powered engine according to claim 11, comprising an elastic stop placed between a mobile point of the regulation device and a point of the armature of the rotor, so that said elastic stop having a limited stroke, exerts an effort (E) on said regulation device, opposing the effort (F) exerted by said elastic return members on said regulation plate, with sensitive effect when the speed of rotation of the rotor becomes close to and slightly less than the nominal speed of rotation.

13. Aerogenerator according to claim 12, wherein said elastic stop is borne by said regulation plate and it cooperates with a finger fast with a hub of said rotor.

14. Aerogenerator according to claim 12, wherein said elastic stop is borne by said frame.

15. Aerogenerator according to claim 11, comprising a linear induction motor having a fixed inductor and a disc or inertia ring fast with said regulation plate and a device for controlling the electrical supply of said linear induction motor, which is controlled by a differential effect between the period of the alternating electric current (A) produced by an alternator driven by said rotor and that of a periodic electric reference signal (B).

16. Aerogenerator according to claim 15 wherein the reference signal is supplied by a reference oscillator.

17. Aerogenerator according to claim 15, comprising an inhibitor employing eddy currents acting on said disc or said inertia ring fast with said regulation plate and which is supplied as a function of the curves and of a ceiling of production current intensity in order to limit the power of the aerogenerator and possibly its speed.

18. Aerogenerator according to claim 16, comprising an inhibitor employing eddy currents acting on said disc or said inertia ring fast with said regulation plate and which is supplied as a function of the curves and of a ceiling of production current intensity in order to limit the power of the aerogenerator and possibly its speed.

19. Aerogenerator or wind-powered engine according to claim 11 wherein the compensating means are constituted, when the elastic return members of the blades are constituted by hydraulic or pneumatic devices, by means (15, 16) acting on the flowrate and supply pressure of said hydraulic or pneumatic devices, so as to compensate the disturbing force creating by the out-of-balance rear mass.

20. Aerogenerator or wind-powered engine according to claim 19, wherein it comprises an elastic stop (18) placed between a mobile point of the regulation device and a point of the armature of the rotor, so that the elastic stop (18), having limited stroke, exerts an effort (E) on the regulation device, opposing the effort (F) exerted by the elastic return members (5) on the regulation plate (6), with sensitive effect when the speed of rotation of the rotor becomes close to and slightly less than the nominal speed of rotation.

* * * * *